E. BRONNERT.
PROCESS FOR RECOVERING COPPER FROM THE WASH LIQUORS EMPLOYED IN THE CUPRAMMONIA CELLULOSE PROCESS.
APPLICATION FILED JAN. 14, 1911.
1,049,201.
Patented Dec. 31, 1912.
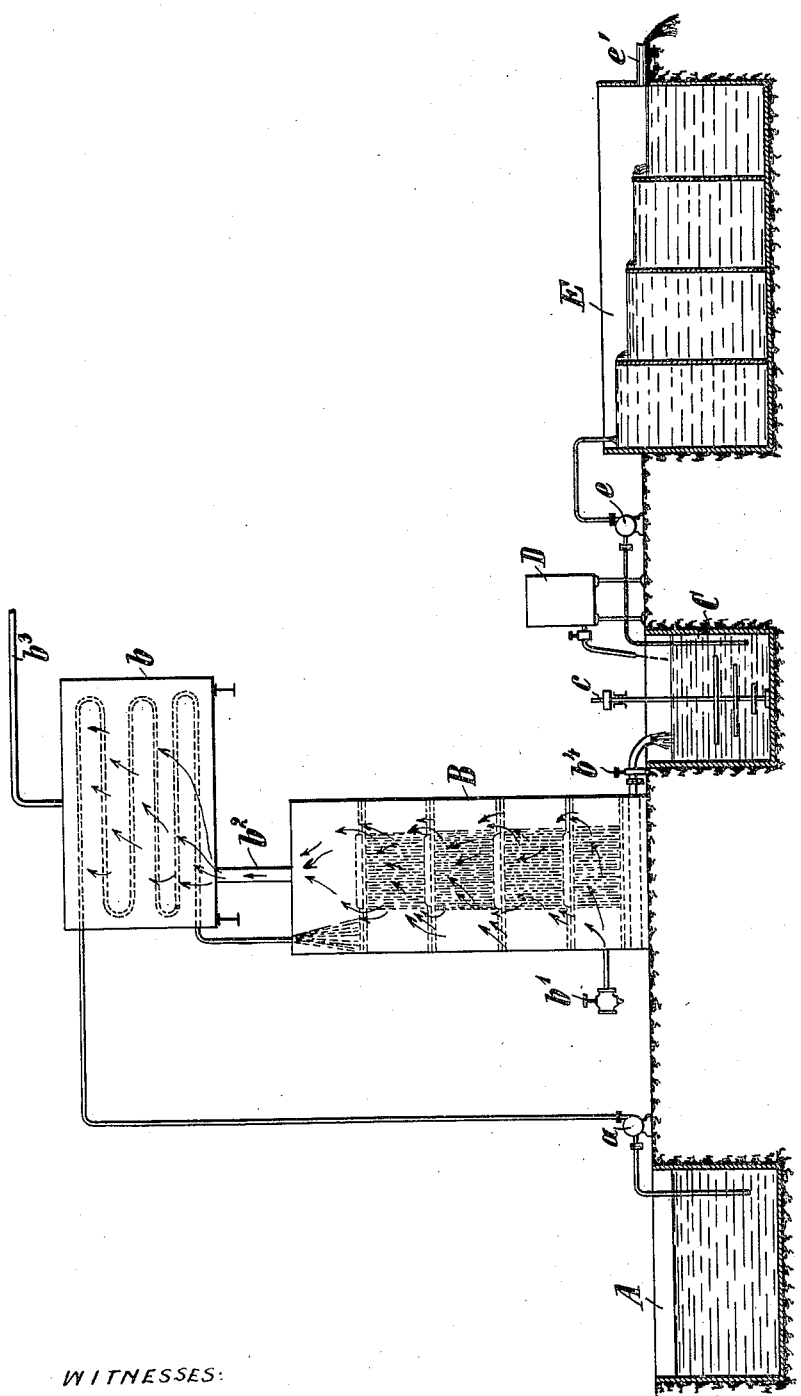

UNITED STATES PATENT OFFICE.

EMILE BRONNERT, OF NIEDERMORSCHWEILER, GERMANY, ASSIGNOR TO VEREINIGTE GLANZSTOFF-FABRIKEN A. G., OF ELBERFELD, GERMANY.

PROCESS FOR RECOVERING COPPER FROM THE WASH LIQUORS EMPLOYED IN THE CUPRAMMONIA-CELLULOSE PROCESS.

1,049,201.       Specification of Letters Patent.     Patented Dec. 31, 1912.

Application filed January 14, 1911. Serial No. 602,725.

*To all whom it may concern:*

Be it known that I, EMILE BRONNERT, a subject of the German Emperor, residing at Niedermorschweiler, Germany, have invented certain new and useful Improvements in the Process for Recovering Copper from the Wash Liquors Employed in the Cuprammonia-Cellulose Process, of which the following is a specification.

If ammonia is expelled from an alkaline cuprammonia solution (such as is produced, for instance, by the absorption of ammonia-bearing gases by wash liquors resulting from the manufacture of cellulose articles, such as filaments, threads, films and the like, from cuprammonia cellulose solutions by precipitation with alkaline agents, such as sodium saccharate, and subsequent washing with water) by means of a current of steam which is led in contact with and in the opposite direction to, the liquid trickling down in a suitable apparatus, the copper contained in the solution will be reduced to an oxid of copper, such as the brown cuprous oxid, and partly even to metallic copper. Such reduced copper and cuprous oxid cannot be completely separated from the supernatant liquid by settling; but may be transformed after separation, by heating in the air, into cupric oxid which may be used again in the cycle of operations. I have found that the copper and the oxid of copper can easily be almost entirely recovered from the relatively large quantities of wash liquors if small amounts of certain colloids (either as such or first stirred in water) are mixed (under agitation) with the hot liquors flowing from the distilling apparatus. This causes the copper or the oxid to form balls or globules. Experiments have shown that starch is the cheapest and most practical agent for this purpose.

The recovery is obtained in the simplest manner by adding starch to the liquors and causing it to flow through several vats or pits in a cascade arrangement, the major portion of the slimes being deposited at the bottom of the first vat as a compact spongy mass and the liquid flowing off clear at the end of the subsequent vats.

The invention may be illustrated further by the following example: Into the hot, weakly alkaline liquor flowing from the ammonia distilling column and containing the cuprous oxid or even metallic copper in a state of exceedingly fine suspension, I add a stream of a milk-like liquid made by stirring starch in cold water, the amount added being such that there will be about 1 kilogram of starch for each 10 cubic meters of alkaline liquor. The mixture may be accomplished automatically by causing one stream to flow into the other.

According to the greater or less alkalinity of the liquors the amount of starch may be slightly increased or diminished. If the alkalinity of the liquors is too great, which would cause the starch to lose its colloidal characteristics, the liquors may be diluted with water until they are weak enough. A suitable dilution of the liquor is .1–.5 gram sodium hydrate (NaOH) to 1 liter of water in a solution in which soda is used as the alkaline precipitating agent. The starch used may be the commercial article of lowest quality and of any vegetable extraction (as for instance wheat-starch, rice-starch, palm-starch, etc.). The agglutination is conducted in the manner described above preferably in the hot liquid itself, as the agglomeration of the copper or its oxid will then proceed most efficiently and rapidly. The proper proportioning of the addition may be ascertained by removing a test portion, in which the slime should settle at once, leaving an absolutely clear supernatant liquid.

It is obvious copper may be recovered by the present process from wash liquors which have not been used to absorb ammonia freed in the precipitating operation, but which come directly from a washing vat or the like.

Starch has been mentioned herein as the specific colloidal carbo-hydrate employed, but other specific carbo-hydrates of the class of cellulose may be employed instead, as inulin, lichenin, dextrin, bassorin (carrageenin) or wood-cellulose forming a colloidal pap.

An apparatus in which the process may be carried out, is illustrated diagrammatically in the accompanying drawing, in which A is a tank containing the wash liquors, containing ammonia in solution, from which the copper is to be recovered, and B is a column through which the wash liquors trickle or drip preferably in the opposite direction to a current of hot fluid, as steam. The wash liquors are preferably pumped from the vat A to the upper part of the column B by means of a pump $a$. The wash liquors are also preferably heated prior to reaching the column B by being passed through a dephlegmator or heating coil $b$. Steam may be admitted to the lower end of the column B through a cock $b^1$. The freed ammonia and steam may flow off through the pipe $b^2$, into the dephlegmator $b$ and out through the pipe $b^3$. From the bottom of the column, the wash liquor, freed from the ammonia, flows out through the cock $b^4$ into a vat C, where it is mixed with a colloidal solution, which may be admitted from a tank D. An agitator $c$ is preferably provided for more thoroughly effecting the mixture of the liquids. A series of settling tanks E, arranged in cascade, into which the mixture may be pumped by a pump $e$, may be provided in which the agglomeration may settle and be collected, the water flowing off clear from the spout $e^1$ at the end of the cascade.

Wash liquors which have not been used to absorb ammonia from the precipitating bath, may be admitted directly to the vat C, and mixed with the agglutinating solution.

I claim as my invention:—

1. The process of recovering copper from the wash liquors employed in the manufacture of artificial cellulose articles from cuprammonium cellulose solutions which liquors have been used for absorbing ammonia, which process comprises removing the ammonia from the liquors by distillation, adding small quantities of a colloidal carbohydrate of the class of cellulose, and separating the agglomerated mass from the alkaline liquor.

2. The process of recovering copper from the wash liquors employed in the manufacture of artificial cellulose articles from cuprammonium cellulose solutions which liquors have been used for absorbing ammonia, which process comprises removing the ammonia from the liquors by distillation, adding small quantities of a colloidal carbohydrate of the class of cellulose, and separating the agglomerated mass from the alkaline liquor by decantation.

3. The process of recovering copper from the wash liquors employed in the manufacture of artificial cellulose articles from cuprammonium cellulose solutions which liquors have been used for absorbing ammonia, which process comprises removing the ammonia from the liquors by distillation, diluting the liquors, adding small quantities of a colloidal carbohydrate of the class of cellulose, and separating the agglomerated mass from the alkaline liquor.

4. The process of recovering copper from wash liquors employed in the manufacture of artificial cellulose articles from cuprammonium cellulose solutions, which process comprises adding small quantities of a colloidal carbohydrate of the class of cellulose to the wash liquors, and separating the agglomerated mass from the alkaline liquor.

5. The process of recovering copper from wash liquors employed in the manufacture of artificial cellulose articles from cuprammonium cellulose solutions, which liquors have been used for absorbing ammonia, which process comprises removing the ammonia from the liquors by distillation, adding small quantities of starch to the wash liquors, and separating the agglomerated mass from the alkaline liquor.

6. The process of recovering copper from wash liquors employed in the manufacture of artificial cellulose articles from cuprammonium cellulose solutions, which process comprises adding small quantities of starch to the wash liquors, and separating the agglomerated mass from the alkaline liquor.

In witness whereof, I have hereunto signed my name in the presence of two subscribing witnesses.

EMILE BRONNERT.

Witnesses:
 JOSEPH WILLARD,
 WALTER J. SKERTEN.